Nov. 17, 1931.  R. JANSSEN  1,832,555
HARROW CLEANER
Filed Feb. 21, 1930  2 Sheets-Sheet 1
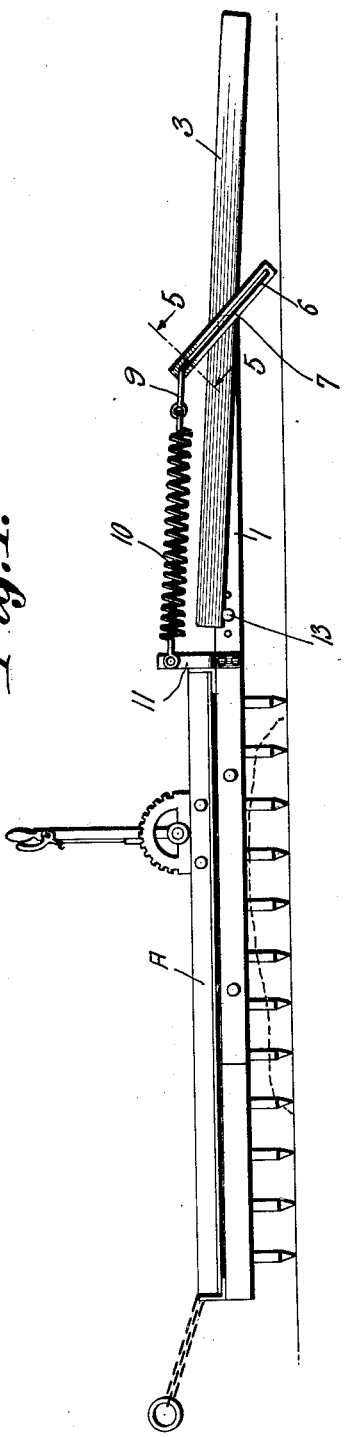
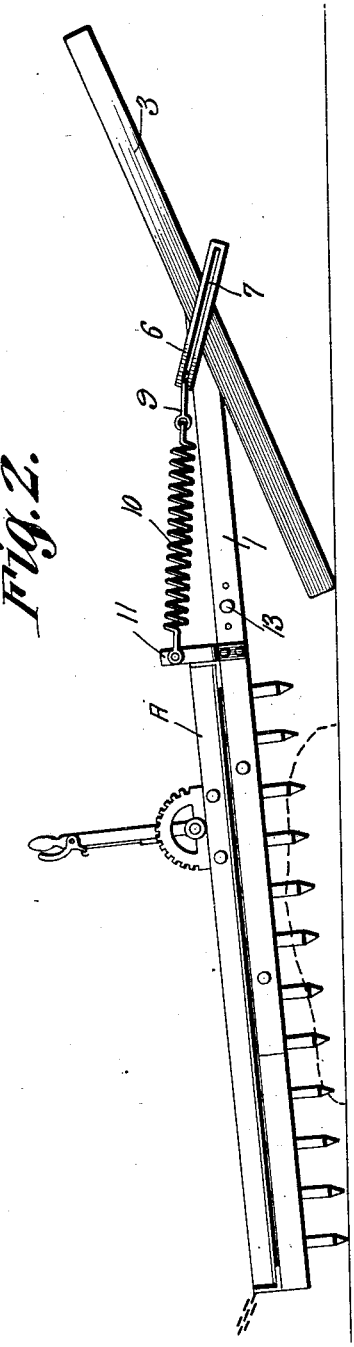
Raymond Janssen, INVENTOR
BY Victor J. Evans
ATTORNEY Nov. 17, 1931.                R. JANSSEN                1,832,555
                            HARROW CLEANER
                         Filed Feb. 21, 1930            2 Sheets-Sheet 2
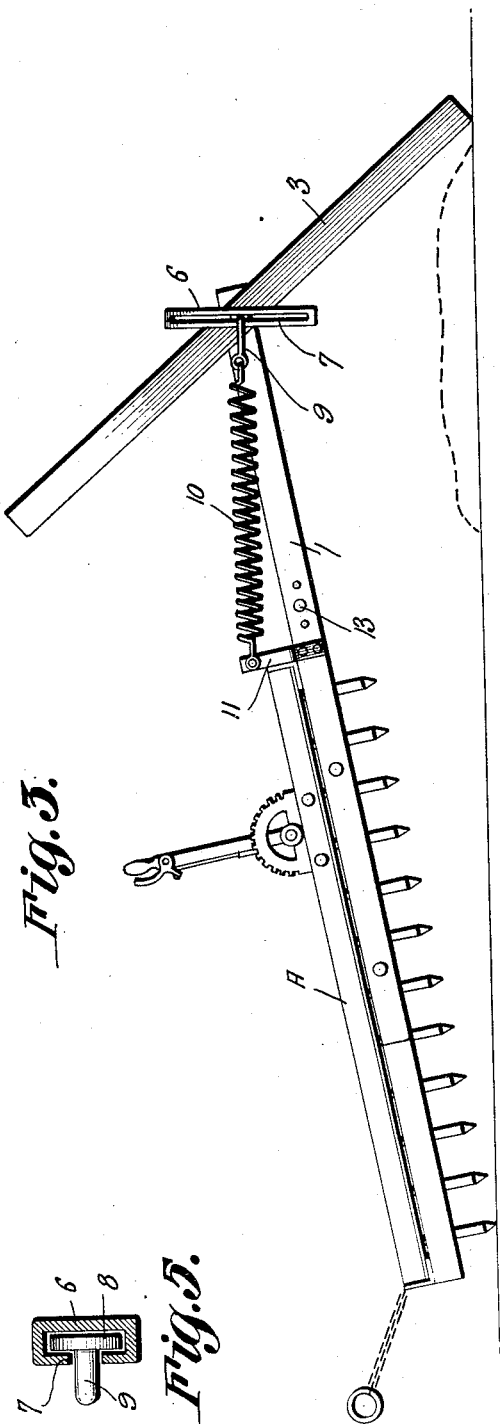
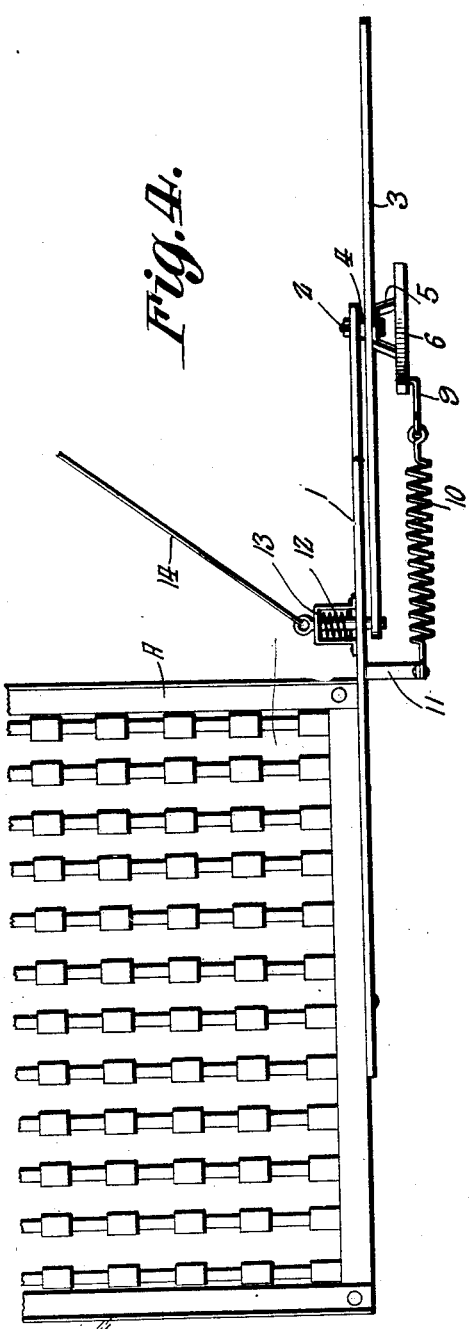
Raymond Janssen,
INVENTOR
BY Victor J. Evans
ATTORNEY Patented Nov. 17, 1931

1,832,555

UNITED STATES PATENT OFFICE

RAYMOND JANSSEN, OF ESTHERVILLE, IOWA

HARROW CLEANER

Application filed February 21, 1930. Serial No. 430,367.

This invention relates to a cleaner attachment for a harrow, the general object of the invention being to provide means for tilting the harrow whenever desired to free the teeth of the same of trash and the like.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of a harrow, showing the invention thereon.

Figure 2 is a similar view, but showing the harrow being lifted by the device.

Figure 3 is a similar view, but showing the harrow after it has been lifted and as it is returning to lowered position.

Figure 4 is a plan view.

Figure 5 is a section on line 5—5 of Figure 1.

In these views, the numeral 1 indicates a bar attached to one side of a harrow A, the bar extending beyond the rear edge of the harrow and the rear extremity of the bar carries a bolt 2 which passes through the center of a lifter bar 3, so that the bolt acts as a pivot for said bar 3. A spacer 4 is arranged between the two bars and a bracket 5 is held against the bar 3 by the head of the bolt. An elongated hollow member 6 is supported by the bracket, this member having an elongated slot 7 in its outer face. A shoe 8 is slidably arranged in the hollow member and has its stem 9 passing through the slot therein. A coil spring 10 has one end connected with the stem and its other end is connected with a bracket 11 on the bar 1.

A spring pressed pin 12 passes through a hole in the bar 1 and is supported by a bracket 13 connected with the bar, the spring normally holding the pin in a position where it will form a rest for the front end of the bar 3. A cable 14 is connected with the head of the pin and extends to a point adjacent the driver's seat of the tractor or other implement to which the harrow is attached.

From the foregoing it will be seen that the spring 10 tends to hold the parts with one end of the bar 3 supported by the pin 12 and when the harrow is to be lifted to dump trash collecting on the teeth thereof, it is simply necessary to retract the pin by a pull upon the cable 14 so that the front end of the bar 3 will drop into engagement with the ground and the spring 10 will act to cause the bar to engage the ground and then as the harrow continues to move forwardly, the bar 3 will rotate on its pivot 2 through its engagement with the ground, thus lifting the harrow, as shown in Figures 2 and 3, so that the trash will drop therefrom. On the continued forward movement of the harrow, the bar 3 continues to turn until finally its opposite end will engage the pin 12 and then the harrow will have all of its teeth engaging the ground, as shown in Figure 1. By having the spring attached to the shoe slidably arranged in the member 6, the spring will permit rotary movement of the bar 3 and hold it against the pin 12.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An attachment for a harrow comprising a supporting member connected with the harrow and extending beyond the rear edge thereof, a bar pivoted midway its ends to the rear end of the supporting member, a guideway connected with the pivotal point of the bar, a shoe slidably mounted in the guideway, a spring connected with the shoe and with a stationary part on the supporting member, a spring pressed pin carried by the supporting member and forming a rest for the front end of the bar and a cable connected with the pin for retracting the same for permitting the front end of the bar to drop into engagement with the ground by the influence of the spring.

2. An attachment for a harrow comprising a supporting member connected with the harrow and extending beyond the rear edge thereof, a bar pivoted intermediate its ends to the rear end of the supporting member, a bracket secured to the bar by the pivot between said bar and the supporting member, a hollow member carried by the bracket and disposed angularly to the bar and having a slot in one face thereof, a shoe slidable in the hollow member, a stem on the shoe and extending through the slot, a spring secured to the stem and to the supporting member, and a manually operated spring pressed pin carried by the supporting member to engage the bar for supporting the forward end thereof away from the ground and adapted to release said end of the bar when actuated to permit the spring to move the forward end of the bar into engagement with the ground for elevating the harrow by said forward end of the bar fulcruming on the ground.

In testimony whereof I affix my signature.

RAYMOND JANSSEN.